Figure 5A:
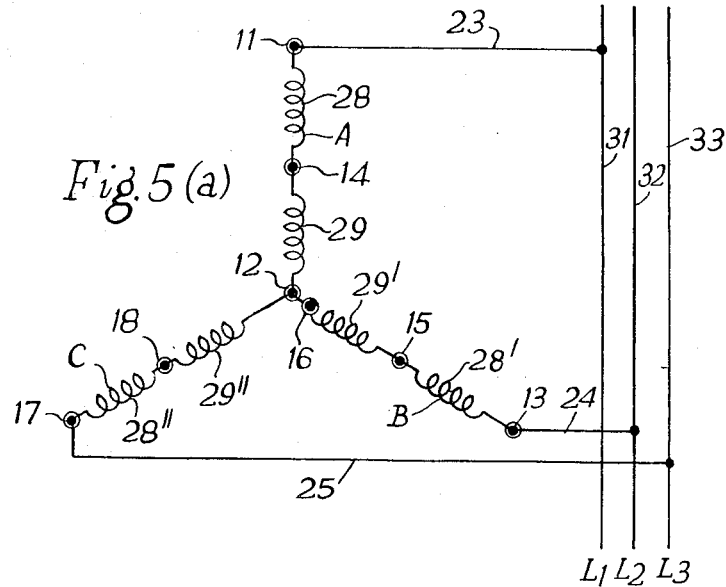

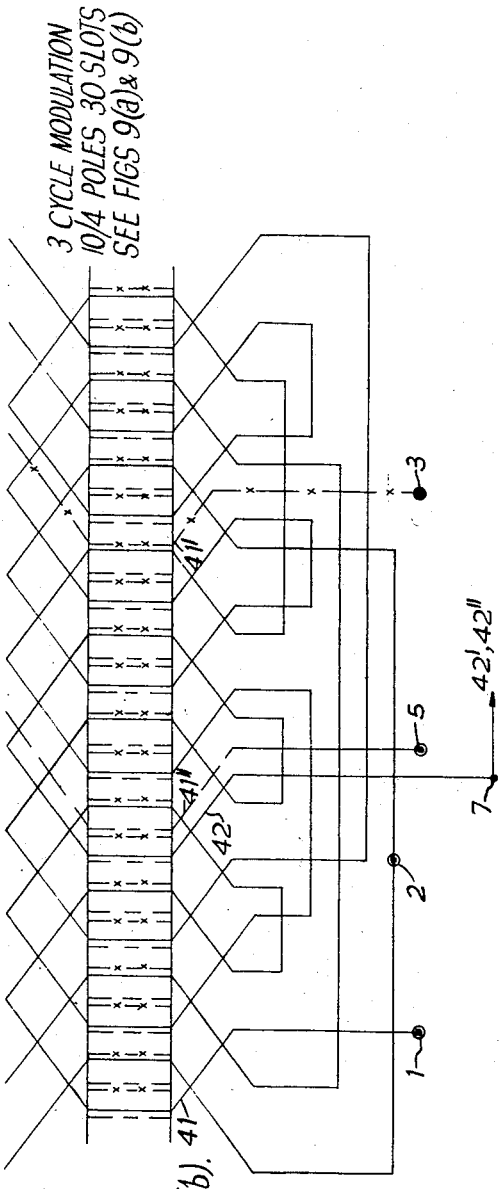

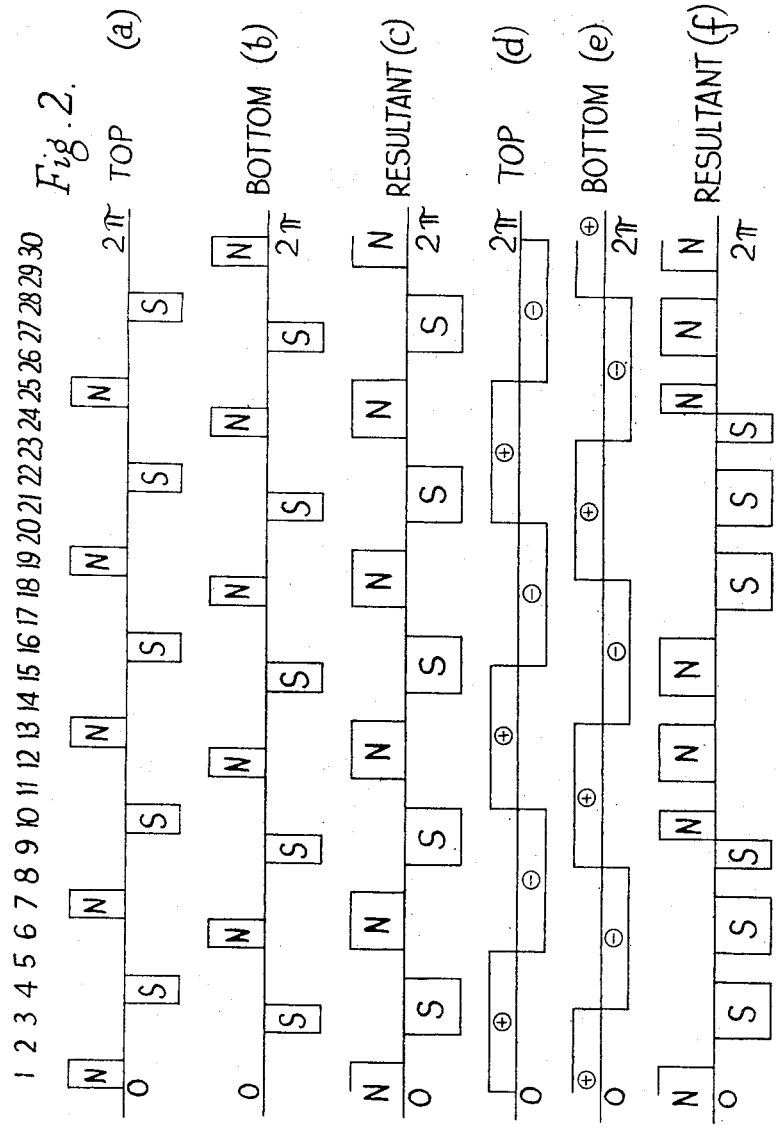

Fig. 3(a).

Fig. 3(b). 3 CYCLE MODULATION 8/2 POLES 36 SLOTS SEE FIGS 5(a) 5(b) 7(a) 7(b)

Fig. 4.

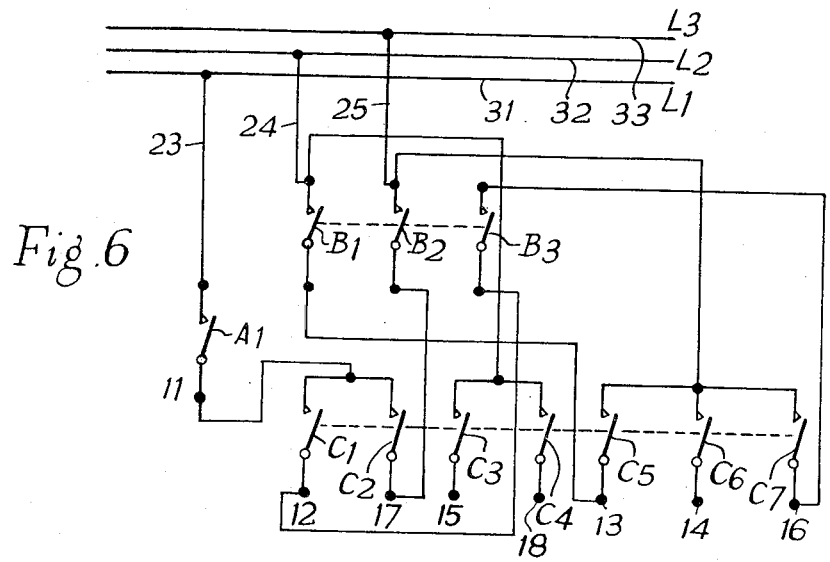
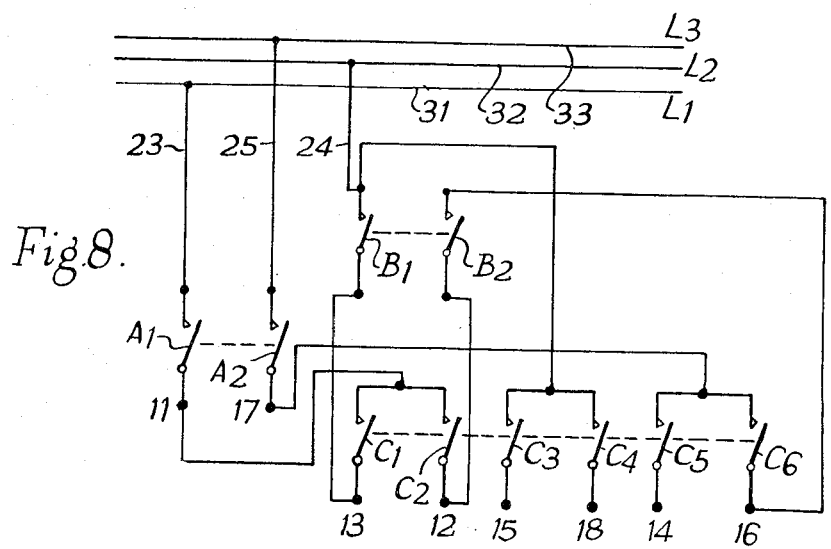

3-CYCLE MOD
8 POLE/2 POLE
36 SLOTS
SERIES STAR/
PARALLEL DELTA

6-CYCLE MOD
10 POLE/2 POLE
72 SLOTS
SERIES STAR/
PARALLEL DELTA

Fig. 13(a)  TABLE I

POSSIBLE POLE-COMBINATIONS FOR 3N-CYCLE POLE-AMPLITUDE MODULATION

|   | 3-CYCLE | 6-CYCLE | 9-CYCLE |
|---|---|---|---|
| m = | (6m+2)/(6m+2−6) | (6m+2)/(6m+2−12) | (6m+2)/(6m+2−18) |
| 6 | 38/32 | 38/26 | 38/20 |
| 5 | 32/26 | (32/20) | 32/14 |
| 4 | 26/20 | 26/14 | 26/8 |
| 3 | 20/14 | (20/8) | x--20/2--x |
| 2 | 14/8 | x--14/2--x | 14/4 |
| 1 | x--8/2--x | (8/4) | 8/10 |
| 0 | (2/4) | 2/10 | 2/16 |

| m = | (6m+4)/(6m+4−6) | (6m+4)/(6m+4−12) | (6m+4)/(6m+4−18) |
|---|---|---|---|
| 6 | 40/34 | (40/28) | 40/22 |
| 5 | 34/28 | 34/22 | 34/16 |
| 4 | 28/22 | (28/16) | 28/10 |
| 3 | 22/16 | 22/10 | x--22/4--x |
| 2 | 16/10 | (16/4) | 16/2 |
| 1 | 10/4 | x--10/2--x | 10/8 |
| 0 | x--(4/2)--x | (4/8) | 4/14 |

Fig. 13(b)

TABLE I - CONTINUED

| | 12-CYCLE | 15-CYCLE | 18-CYCLE |
|---|---|---|---|
| m = | (6m+2)/(6m+2-24) | (6m+2)/(6m+2-30) | (6m+2)/(6m+2-36) |
| 6 | 34/14 | 38/8 | x――― 38/2 ―――x |
| 5 | (32/8) | 32/2 x―――――x | (32/4) |
| 4 | 26/2 x―――――x | 26/4 | 26/10 |
| 3 | (20/4) | (20/10) | (20/16) |
| 2 | 14/10 | 14/16 | 14/22 |
| 1 | (8/16) | 8/22 | (8/28) |
| 0 | 2/22 | 2/28 | 2/34 |
| m = | (6m+4)/(6m+4-24) | (6m+4)/(6m+4-30) | (6m+4)/(6m+4-36) |
| 6 | (40/16) | (40/10) | (40/4) x―――――x |
| 5 | 34/10 | 34/4 x―――――x | 34/2 |
| 4 | (28/4) x―――――x | 28/2 | (28/8) |
| 3 | 22/2 | 22/8 | 22/14 |
| 2 | (16/8) | 16/14 | (16/20) |
| 1 | 10/14 | (10/20) | 10/26 |
| 0 | (4/20) | 4/26 | (4/32) |

IMPORTANT POLE-NUMBER COMBINATIONS PROVIDED BY 3N-CYCLE POLE-AMPLITUDE MODULATION

TABLE II

*Fig. 14*

| POLE-RATIO | PHASE-WINDING INTERCONNECTIONS. | MODULATING CYCLES |
|---|---|---|
| 20/2 | SERIES-STAR/PARALLEL-DELTA II | 9-CYCLE |
| 16/2 | SERIES-STAR/PARALLEL-DELTA I | 9-CYCLE |
| 14/2 | SERIES-STAR/PARALLEL-DELTA II | 6-CYCLE |
| 10/2 | SERIES-STAR/PARALLEL-DELTA I | 6-CYCLE |
| 8/2 | SERIES-STAR/PARALLEL-DELTA II | 3-CYCLE |
| (TWICE 16/2) 32/4 | AS RATIO 16/2 | 18-CYCLE |
| (TWICE 14/2) 28/4 | AS RATIO 14/2 | 12-CYCLE |
| 26/4 | SERIES-STAR/PARALLEL-DELTA I | 15-CYCLE |
| 22/4 | SERIES-STAR/PARALLEL-DELTA II | 9-CYCLE |
| (TWICE 10/2) 20/4 | AS RATIO 10/2 | 12-CYCLE |
| (TWICE 8/2) 16/4 | AS RATIO 8/2 | 6-CYCLE |
| 14/4 | SERIES-STAR/PARALLEL-DELTA I | 9-CYCLE |
| 10/4 | SERIES-STAR/PARALLEL-STAR | 3-CYCLE |
| (FOUR × 8/2) 32/8 | AS RATIO 8/2 | 12-CYCLE |
| (TWICE 14/4) 28/8 | AS RATIO 14/4 | 18-CYCLE |
| 26/8 | SERIES-STAR/PARALLEL-STAR | 9-CYCLE |
| 22/8 | SERIES-STAR/PARALLEL-STAR | 15-CYCLE |
| (TWICE 10/4) 20/8 | AS RATIO 10/4 | 6 CYCLE |
| 14/8 | SERIES-DELTA/PARALLEL-STAR | 3-CYCLE |

United States Patent Office 3,197,686
Patented July 27, 1965

3,197,686
ROTARY ELECTRIC MACHINES PROVIDING POLE-CHANGING BY POLE-AMPLITUDE MODULATION
Gordon Hindle Rawcliffe, Clifton, Bristol, and William Fong, Redland, Bristol, England, assignors to National Research Development Corporation
Filed June 16, 1961, Ser. No. 117,576
Claims priority, application Great Britain, July 5, 1960, 23,417/60; Nov. 16, 1960, 39,434/60
6 Claims. (Cl. 318—224)

This invention relates to rotary electric machines, particularly to 3-phase, alternating current pole-changing electric motors adapted to run at two alternative speeds.

It is well known to provide an A.C. electric motor having either separate sets of phase-windings providing alternative pole numbers or having a single set of phase-windings with suitable connections to the coils brought out to a multiple switch, so that the single set of phase-windings can be switched to provide alternative pole numbers. The most common arrangements provide alternative pole numbers in the ratio 2:1, and hence alternative operating speeds in the reverse ratio.

*Pole amplitude modulation*

Recently, a new principle for providing alternative pole numbers in a rotary electric machine with a single set of phase-windings has been developed. This principle is known as "Pole-Amplitude Modulation" and has been described in two papers by Professor G. H. Rawcliffe and others, the earlier entitled "Induction Motor Speed-Changing by Pole-Amplitude Modulation" in the Proceedings of the Institution of Electrical Engineers, vol. 105, Part A, No. 22, August 1958, and the later entitled "Speed-Changing Induction Motors—Further Developments in Pole-Amplitude Modulation" in the Proceedings of the Institution of Electrical Engineers, vol. 107, Part A, No. 36, December 1960.

While the above-mentioned references give a full explanation of the general theory of pole-amplitude modulation, it may briefly be said here that a 3-phase, A.C. machine having a single set of three phase-windings wound to provide a first pole number may be adapted to operate at an alternative pole number, in a ratio less than 2:1, if a pole-amplitude modulation wave is applied to each phase winding, the three modulating waves being relatively displaced, around the axis of the machine, by $$\frac{2\pi}{3}$$

The pole-amplitude modulation of each phase winding is effected by switching successive portions of the phase winding around the periphery of the machine so that, in the modulated connection, one portion is reversed in polarity and one portion retains its original polarity for each complete cycle of the modulating wave. In addition, further expedients are employed to ensure that the amplitudes of the poles, in the modulated connection, are not uniform but follow more nearly a sinusoidal amplitude distribution in each modulating wave. To this end, one pole may be omitted at one end of each modulation half-cycle, or both end poles may be reduced in amplitude or the machine may be wound originally as a fractional-slot machine to provide a sinusoidal distribution of the pole amplitudes for both the modulated and unmodulated connections. If each pole-amplitude modulating wave has one complete cycle of modulation around the complete machine perimeter, the difference between the first pole number and the alternative pole number is one pole pair.

*Multiple cycle modulation*

It is furthermore possible for each modulation wave to have two, three or more complete cycles of modulation around the complete machine perimeter, giving a difference between the first pole number and the alternative pole number of two pole pairs, three pole pairs and so on respectively.

In some cases, such as 16/20 poles for example, this arrangement corresponds to a repetition of 8/10 poles twice around the machine perimeter.

In other cases, such as 10/14 poles for example, the modulating waves cannot be divided into two identical halves, but the complete machine perimeter contains two complete cycles of modulation.

The present invention provides rotary electric machines adapted to operate with a first pole number and with an alternative pole number by pole-amplitude modulation, wherein the pole-amplitude modulating wave has three complete cycles of modulation, or a multiple of three complete cycles, in the complete machine perimeter.

It has now been found that such a machine has valuable practical advantages. A three-cycle pole-amplitude modulating wave can be applied to the phase-wndings of any normal integral-slot or fractional slot machine, in such a way that the modulating effect is symmetrical for all three phase-windings, provided that the first pole-number for which the phase-windings are wound is not a multiple of "3."

In a three-phase machine, except for the excluded case where the first pole-number is a multiple of "3," a displacement around one-third of the machine perimeter represents a movement from one phase-winding to a corresponding point in another phase-winding, and it corresponds to one of the three cycles of the modulating wave. In fact, the three modulating waves are identical, because a 3-cycle modulating wave, when displaced by one-third of the machine perimeter from its initial position, appears still to have the same shape and position.

The following analysis is not necessary for a full understanding of the invention and of the practical embodiments described herein. Since the technique of pole-changing by pole amplitude modulation is a very recent development in electric machine technology, however, the following analysis is included to explain the theoretical basis of the practical effect described herein.

Consider a three-phase machine having three phase windings each wound conventionally to provide p pole-pairs. By switching means, described in full detail hereinafter, which divide each phase-winding into six consecutive and similar parts and which provide for the reversal of the 2nd, 4th and 6th said parts, relatively to the 1st, 3rd and 5th, the M.M.F. waveform of each phase-winding may be considered to be amplitude modulated according to a three-cycle modulation wave applied to the p pole-pair field over the whole (peripheral) length of each phase-winding.

The modulation process can therefore be represented mathematically by expressing the waveform of the three modulated phase-windings, originally providing p pole-pairs, as $$T_1 = A \sin p\theta \sin 3\theta$$
$$= \frac{A}{2}[\sin (p-3)\theta - \sin (p+3)\theta]$$

$$T_2 = A \sin \left(p\theta \frac{2\pi}{3}\right) \sin 3\theta$$
$$= \frac{A}{2}\left\{\sin\left[(p-3)\theta - \frac{2\pi}{3}\right] - \sin\left[(p+3)\theta - \frac{2\pi}{3}\right]\right\}$$

$$T_3 = A \sin \left(p\theta - 3 - \frac{4\pi}{3}\right) \sin 3\theta$$
$$= \frac{A}{2}\left\{\sin\left[(p-3)\theta - \frac{4\pi}{3}\right] - \sin\left[(p+3)\theta - \frac{4\pi}{3}\right]\right\}$$

where $T_1$, $T_2$ and $T_3$ are arbitrarily the first, second and third phase-windings respectively, A is the amplitude of the M.M.F. wave of p pole-pairs, $\theta$ is measured mechanically around the machine axis and $\pi$ is measured electrically relatively to the distribution of p pole-pairs.

It will be noted that the final term for each phase-winding contains terms of the form $\sin (p-3)\theta$ and $\sin (p+3)\theta$. The first such terms of the three-phase-windings combined represent a rotating field of $(p-3)$ pole pairs; the second such terms of the three phase-windings combined represent a rotating field of $(p+3)$ pole pairs when the three phase-windings are supplied with three-phase current.

*Difference from earlier forms of pole amplitude modulation*

It is a feature common to all forms of pole-amplitude modulation that the modulation process provides *two* alternative pole-numbers, the one higher than the original pole-number and the other lower than the original pole-number. One alternative pole-number has to be eliminated in some way, so that the other pole-number remains as the operative alternative pole-number to the original pole-number.

According to the earlier techniques of pole-amplitude modulation, the unwanted modulation product was eliminated by choice of the relative spacing and the sequence around the machine axis of the three modulation waves as applied to the three phase windings.

This requirement imposed some practical limitation, in that either both the original and modulated pole-numbers chosen excluded pole-numbers which were a multiple of "3" or, if a multiple of "3" was included as either operative pole-number, some complication in the switching of the phase-windings resulted.

In machines according to the present invention, both modulation products, that is to say both higher and lower alternative pole-numbers are present in each layer of the complete machine winding. The method of eliminating the unwanted pole-number lies in a choice of suitable chording of the phase-windings.

Either modulated pole-number may be eliminated by using a coil-pitch equal to an even number of pole-pitches of the pole-number concerned. The higher pole-number, because the pole-pitch is correspondingly small, is the more easily eliminated and generally provides a number of optional pitches which satisfy this requirement.

*Available pole-number combinations*

The appended Table I shows some of the available pole-number combinations for a machine according to the invention, using three cycles and multiples of three cycles of modulation, that is $3n$ cycles, from 3-cycles to 18-cycles, that is from $n=1$ to $n=6$. The table could be extended to include higher multiples of 3-cycles, if desired and also extended to include higher pole-numbers, that is higher values of the integer $m$, or negative values of $m$, since the "sign" of the pole number is of no consequence.

In Table I, certain ratios are shown in brackets, these are where both pole-numbers are the same multiple of previous pole-numbers, thus giving duplicate ratios or are in the ratio 2:1, which is a ratio already provided by known machines.

However, Table I includes a considerable number of practically useful pole-number ratios. Those considered to be particularly important are set out in the appended Table II, which shows the pole-number ratio, the number of modulating cycles used and the preferred alternative phase-winding connections, when the requirement is for equal magnetic flux density in the air gap for both pole-numbers.

Figure 5B:
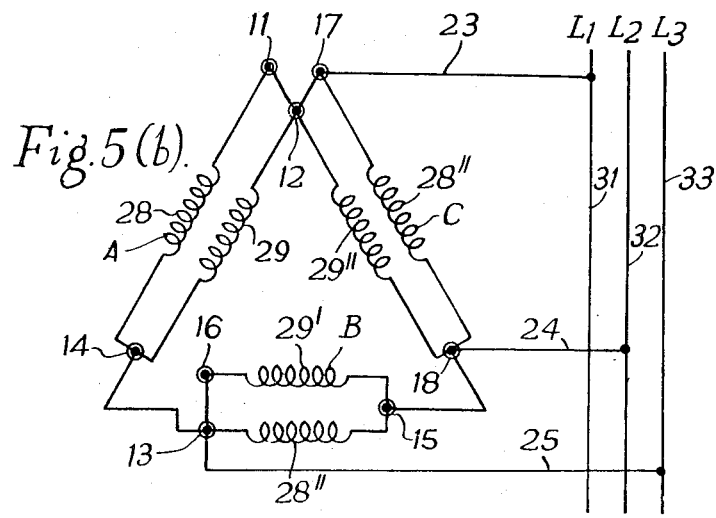

In order that the invention may readily be carried into effect two embodiments will now be described in detail and features of importance of other embodiments taken from Table I will be explained more fully with reference to the accompanying drawings, of which:

FIG. 1(a) and 1(b) show a slot winding diagram of a 10-pole, integral slot, 3-phase A.C. induction motor adapted to operate alternatively as a 4-pole machine by 3-cycle pole-amplitude modulation;

FIG. 2 shows a series of diagrams referred to in the explanation of operation of the motor of FIG. 1;

FIGS. 3(a) and 3(b) show a slot winding diagram of an 8-pole fractional slot, 3-phase A.C. induction motor adapted to operate alternatively as a 2-pole machine by 3-cycle pole-amplitude modulation;

Figure 4:
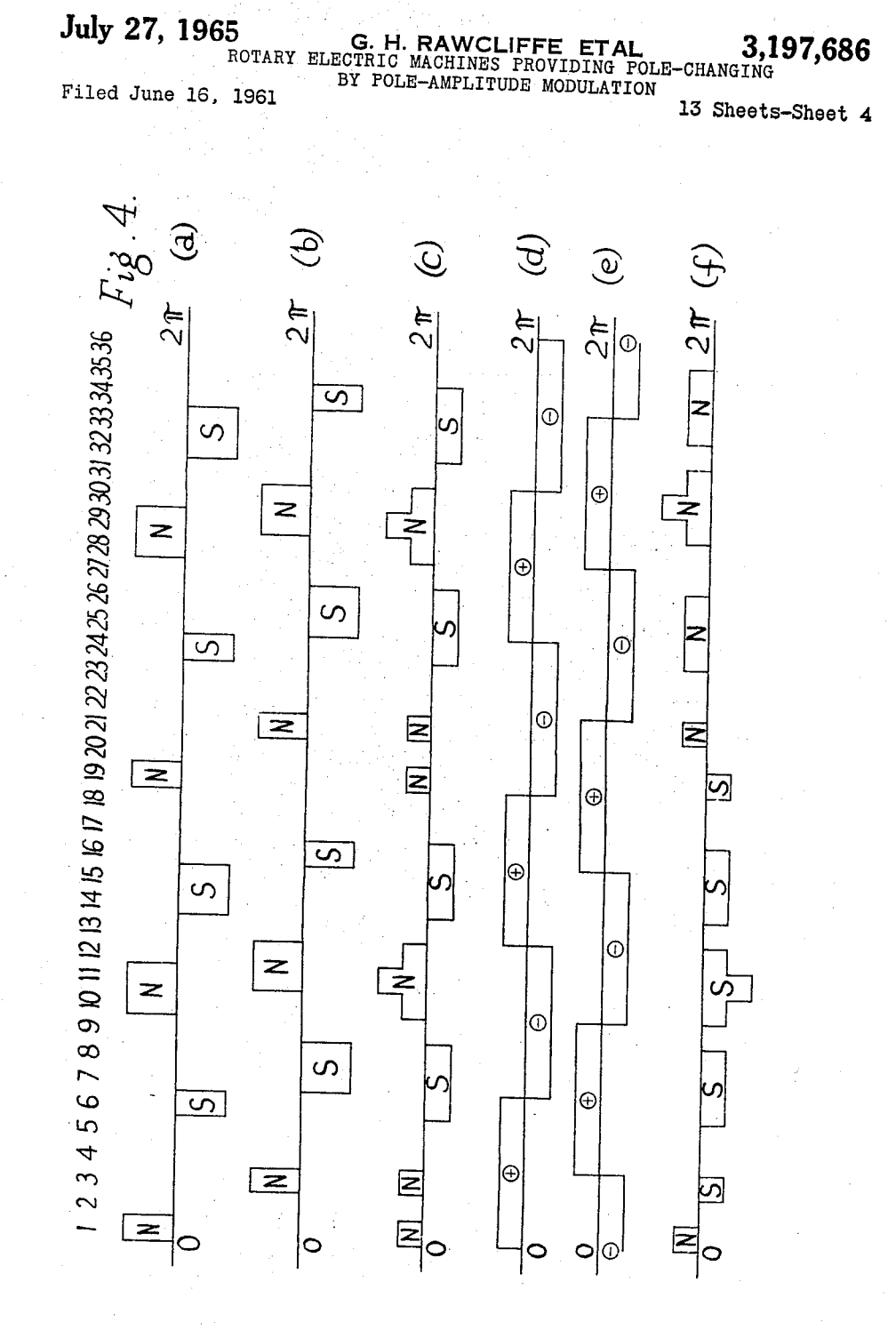

FIG. 4 shows a series of diagrams referred to in the explanation of operation of the motor of FIG. 2;

FIGS. 5(a) and 5(b) show respectively alternative series-star and parallel-delta phase-winding connections for changing the running speed of motors according to the invention;

FIG. 6 is a contactor circuit arrangement for providing the alternative phase-winding connections of FIGS. 5(a) and 5(b).

Figure 7A:
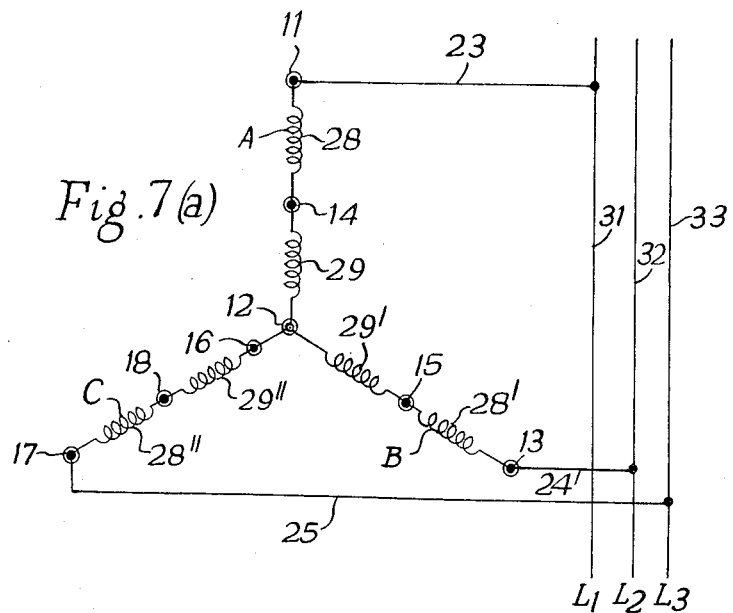
Figure 7B:
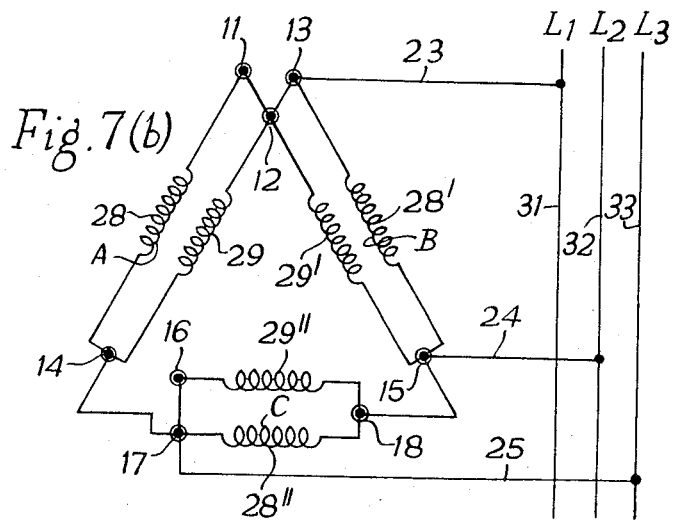
Figure 9A:
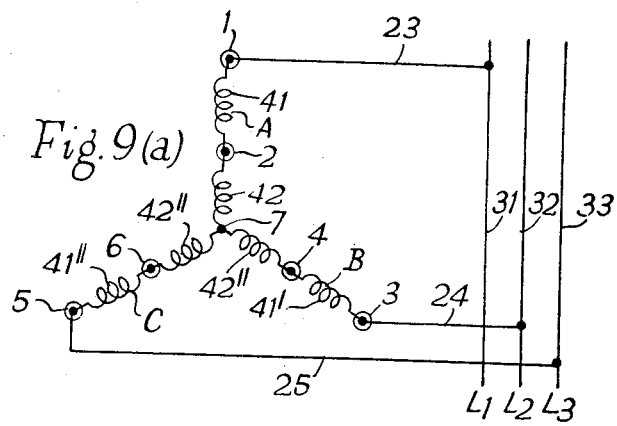
Figure 9B:
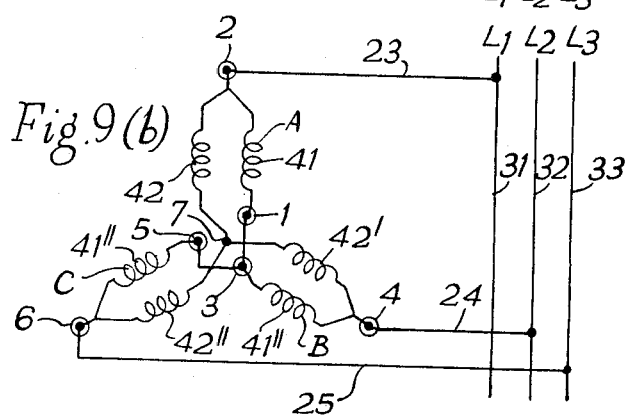
Figure 10:
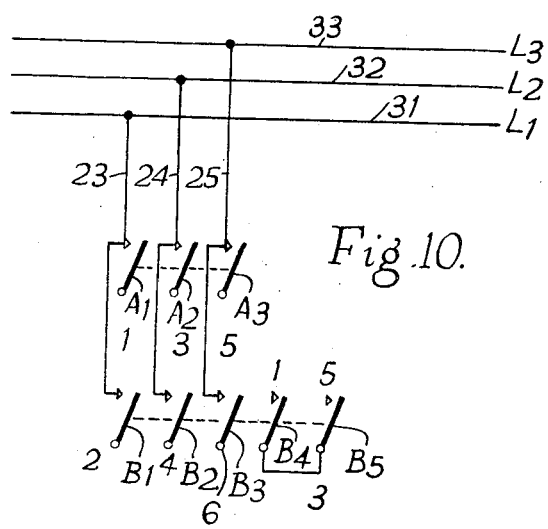
Figure 11A:
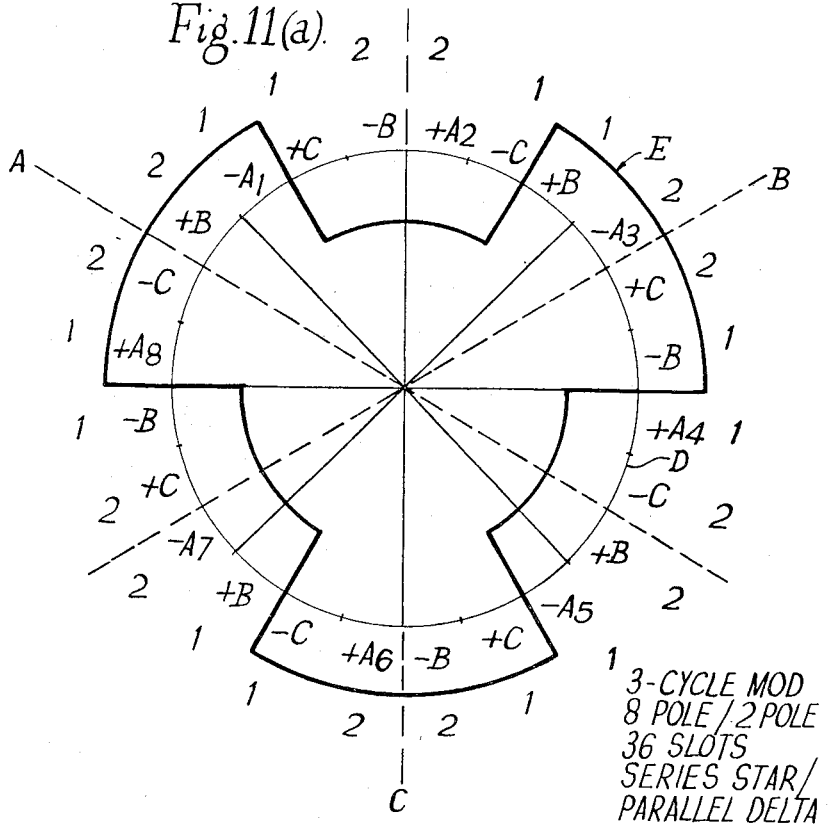
Figure 11B:
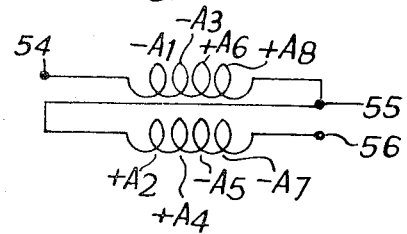
Figure 12A:
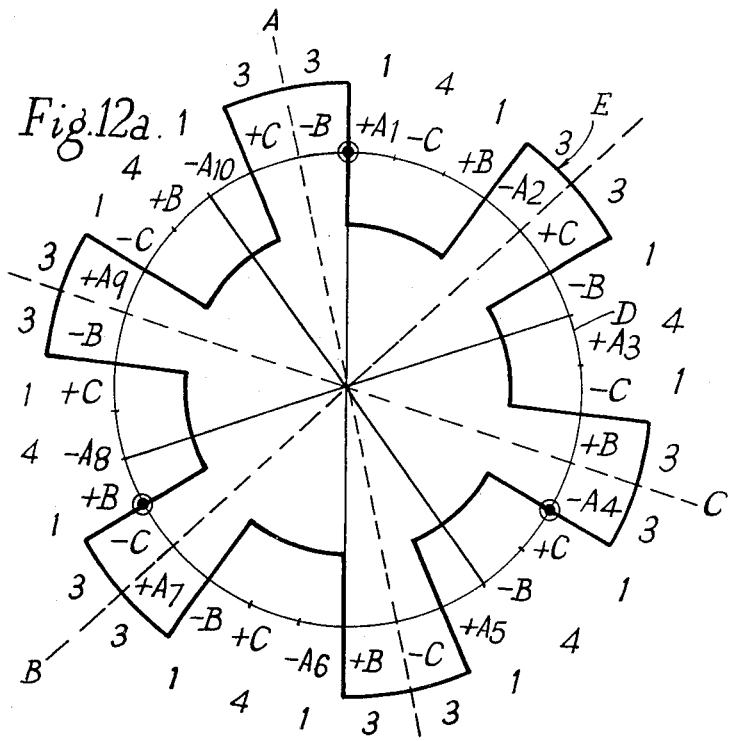
Figure 12B:
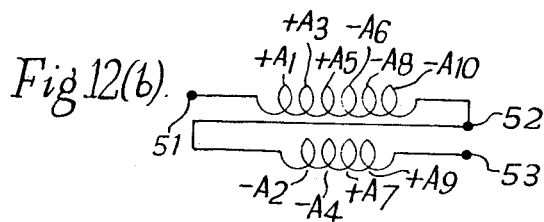

FIGS. 7(a) and 7(b) show respectively alternative series-star and parallel-delta phase-winding connections similar to those of FIGS. 5(a) and 5(b) but providing for the reverse sense of running in parallel-delta connection;

FIG. 8 is a contactor circuit arrangement for providing the alternative phase-winding connections of FIGS. 7(a) and 7(b);

FIGS. 9(a) and 9(b) show respectively alternative series-star and parallel-star phase-winding connections for changing the running speed of motors according to the invention;

FIG. 10 is a contactor circuit arrangement for providing the alternative phase-winding connections of FIGS. 9(a) and 9(b);

FIGS. 11(a) and 11(b) are respectively a clock diagram and phase-winding coil-group connection diagram showing the 8/2 pole motor of FIGS. 3 and 4 in simplified form;

FIGS. 12(a) and 12(b) are corresponding clock diagram and coil-group connection diagram of a 10-pole fractional slot, 3-phase A.C. motor adapted to operate alternatively as a 2-pole machine by 6-cycle pole-amplitude modulation.

FIGS. 13(a) and 13(b) set forth in Table I a considerable number of practically useful pole-number ratios; and FIG. 14 sets forth in Table II those considered to be particularly important.

It will be noted that the practical embodiments particularly described below are all chosen from Table II the first two embodiments using three-cycle modulation and the third embodiment using six-cycle modulation.

In the slot winding diagram of the 10 pole/4 pole motor of FIG. 1(b), for simplicity, only the phase-winding for the first phase (phase A) is shown in full. This diagram should therefore be read together with FIG. 1(a) and the circuit diagrams of FIGS. 9(a) and 9(b).

In the 10/4 pole motor of FIGS. 1 and 2, phase A phase-winding comprises a first set of coils 41 connected between terminals 1 and 2 and a second similar set of coils 42, connected in series with set 41, between terminals 2 and 7. Phase B phase-winding is identical with that of phase A and comprises a set of coils 41′, connected between terminals 3 and 4 and a set of coils 42′, connected between terminals 4 and 7. Phase C phase-winding comprises a set of coils 41″ connected between terminals 5 and 6 and a set 42″ connected between terminals 6 and 7.

In FIG. 1(b) the starts of phase-windings 41′, 42′ and 41″, 42″, are spaced by 10 slots from the start of phase-winding 41, 42.

The phase-windings are wound in two layers and are distributed between the tops and the bottoms of the slots of a 30-slot frame, in the manner shown in FIG. 1(a). The key given in FIG. 1(a) shows the three phase-windings A, B and C and the "go" and "return" conductors for 10-pole operation. The square brackets show the sets of conductors which are reversed for 4-pole operation.

Referring now to FIGS. 9(a) and 9(b), FIG. 9(a) shows the connections of the phase-windings for 10-pole, unmodulated, operation. Terminals 2, 4 and 6 are isolated. Terminals 1, 3 and 5 are connected by lines 23, 24 and 25 respectively to the phase lines 31, 32 and 33 respectively of a 3-phase, A.C. supply.

For 4-pole, modulated, operation, terminals 1, 3 and 5 are connected together, as shown in FIG. 9(b). Terminals 2, 4 and 6 are connected by lines 23, 24 and 25 respectively to lines 31, 32 and 33.

FIG. 2 shows in Diagram a the polarities developed by the conductors of a single phase-winding in the tops of the 30-slot frame. Diagram b similarly shows the polarities developed by the bottom conductors. Diagram c shows the resultant of (a) and (b) and while it serves to indicate the polarities of the conductors in the various slot positions for 10-pole operation, it does not represent the M.M.F. distribution of the machine.

Diagram d shows the 3-cycle, pole-amplitude modulation waveform applied to the conductors in the tops of the 30 slots and Diagram c similarly shows the modulation waveform applied to the bottom conductors.

Diagram f then shows the resultant polarities developed by all conductors of the phase-winding for the modulated condition of 4-poles.

FIGS. 3(a) and 3(b) show the phase-winding arrangement of an 8 pole/2 pole motor and FIG. 3(a) shows the distribution of the three phase-windings, in two layers, between the tops and the bottoms of the slots of a 36-slot frame. FIG. 3(b) shows, in full, the phase-winding for only phase A. This diagram should be read with FIG. 3(a) and the circuit diagrams of FIGS. 5(a) and 5(b), or FIGS. 7(a) and 7(b) as the case may be.

In the 8/2 pole motor of FIGS. 2 and 4, phase A phase-winding comprises a first set of coils 28 connected between terminals 11 and 14 and a second similar set of coils 19 connected between terminals 14 and 12. Phase B phase-winding is identical with that of phase A and phase C and comprises a set of coils 28′, connected between terminals 13 and 15 and a set 29′ connected between terminals 15 and 12. Phase C phase-winding comprises a set of coils 28″ connected between terminals 17 and 18 and a set 29″ connected between terminals 18 and 16.

In FIG. 3(b) the starts of phase-windings 28′, 29′ and 28″, 29″ are spaced by 12 slots from the starts of phase-winding 28, 29.

As in FIG. 1(a), the key in FIG. 3(a) shows the three phase-windings A, B and C and the polarities developed by the conductors in the top-layer and in the bottom-layer of the 36 slots. The signs indicate the "go" and "return" conductors for unmodulated 8-pole operation.

The square brackets indicate the conductors which are reversed in circuit for modulated 2-pole operation.

Referring now to FIGS. 5(a) and 5(b), FIG. 5(a) shows the circuit connections for 8-pole, unmodulated, operation. Terminal 12 is connected to terminal 16 and terminals 14, 15 and 18 are isolated. Terminals 11, 13 and 17 are connected by lines 23, 24 and 25 respectively to the lines 31, 32 and 33 respectively of a 3-phase A.C. supply.

FIG. 5(b) shows the circuit connections for 2-pole modulated operation.

Terminals 11, 12 and 13 are connected together and by line 23 to line 31 of the 3-phase A.C. supply. Terminals 15 and 18 are connected together and by line 24 to line 32 of the 3-phase supply. Terminals 14, 16 and 17 are connected together and by line 15 to line 33 of the 3-phase supply.

FIG. 7(a) corresponds to FIG. 5(a) for 8-pole operation. The circuit of FIG. 7(b) provides for the reverse sense of rotation of the motor at high speed, 2-poles, to that of FIG. 5(b).

FIG. 4 shows in Diagram a the polarities developed by the conductors of phase-winding A in the top layer of the 36 slots of the frame. Diagram b similarly shows the polarities developed by the bottom layer conductors. Diagram c shows the combination of a and b.

Diagram d corresponds to FIG. 2(d) and shows the three cycles of the pole-amplitude modulating wave as applied to the top layer conductors. Diagram e corresponds to FIG. 2(e) and shows the three cycles of modulation applied to the bottom-layer conductors.

Diagram f shows the resultant polarities, after modulation, of all coils of phase A, both top-layer and bottom-layer conductors and is the pole distribution for 2-pole operation.

Referring again to Table II, it will be noted that the preferred phase-winding interconnections given therein generally provide a series-star connection for the higher pole-number and a parallel-delta connection for the lower pole-number of the combination. Such alternative interconnections of the phase-windings require the provision of eight lead-out conductors from the windings, these being brought out to eight terminals for switching.

It may be mentioned here that the choice of the parallel-delta connection for the lower pole-number is not always the preferred connection, as is discussed later herein.

In Table I, it will be seen that the series of pole-number combinations appearing in each column is divided by a line x—x. The pole-number combinations below this line in each column are combinations for which the number of poles in the unmodulated condition is less than the number of poles in the modulating wave.

For machines with these pole-number combinations, switching of the phase-winding interconnections to select the alternative pole-numbers requires a contactor system having eleven contactors, if the machine is required to run in the same sense at both speeds.

Such a contactor system is shown in FIG. 6 of the drawings. The phase-winding circuit diagram to which this contactor system relates is shown in FIGS. 5(a) and 5(b).

If machines with these pole-number combinations are required to run in opposite senses at the two speeds, a contactor system having ten contactors is required.

A ten-contactor system is shown in FIG. 8 of the drawings. The phase-winding circuit diagram to which this contactor system relates is shown in FIGS. 7(a) and 7(b).

The pole-number combinations above the lines x—x in Table I are combinations for which the number of poles in the unmodulated condition is greater than the number of poles in the modulating wave.

For machines with these pole-number combinations, switching of the phase-winding interconnections to select the alternative pole-numbers requires a contactor system having ten contactors, such as is shown in FIG. 8, if the machine is to run in the same sense at both speeds.

If machines with these pole-numbers are required to run in opposite senses at the two speeds, a contactor system having eleven contactors, such as is shown in FIG. 6 is required.

FIG. 5(a) shows a series-star connection of the phase-windings for low-speed operation, that is the higher pole-number. For the series-star connection, terminal 16 is connected to terminal 12 at the star centre and terminals 11, 13 and 17 are respectively connected by lines 23, 24 and 25 to the conductors 31, 32 and 33 of a three-phase supply, the phases of which are referenced $L_1$, $L_2$ and $L_3$. The phase sequence of this phase-winding connection is A, B, C.

In the parallel-delta connection shown in FIG. 5(b), for high-speed operation, that is the lower pole-number terminals 11, 12 and 17 are connected together and by line 23 to conductor 31. Terminals 15 and 18 are connected together and by line 24 to phase $L_2$, conductor 32 and terminals 13, 14 and 16 are connected together and by line 25 to phase $L_3$, conductor 33. The phase sequence of this connection is therefore A, C, B.

FIG. 6 shows a contactor system for providing the alternative phase-winding connections of FIG. 5(a) and FIG. 5(b). The contactor system comprises a single-pole contactor A1, a three-pole contactor B1 to B3 and a seven-pole contactor C1 to C7. The terminals of contactors A and C numbered 11 to 18 are permanently connected to the corresponding numbered phase-winding terminals of FIGS. 5(a) and 5(b). Three terminals of contactors A and B connected by lines 23, 24 and 25 to the three-phase supply on conductors 31, 32 and 33. The third pole of contactor B provides the star-centre connection between terminals 12 and 16.

For the series-star connection of FIG. 5(a), contactors A and B are closed and contactor C is open. For the parallel-delta connection of FIG. 5(b), contactors A and C are closed and contactor B is open.

FIG. 7(a) shows the alternative series-star connections for low-speed operation and FIG. 7(b) the corresponding parallel-delta connections for high-speed operation. The phase sequence remains unchanged for the alternative connections, in this case.

Comparing the phase-winding connections of FIGS. 5(a) and 5(b) with those of FIGS. 7(a) and 7(b), for any machine using alternative series-star and parallel-delta connections, one pair will provide the same direction of rotation at both speeds while the other pair will provide opposite senses of rotation at the two speeds, as explained with reference to Table I.

Comparing the connections of FIG. 7(a) with those of FIG. 5(a), it will be seen that the first phase-winding A 28, 29 remains unchanged. Phase-winding B having the parts 28', 29' is differently connected only in that the part 29' is permanently connected to terminal 12. Phase-winding C having the parts 28", 29" is differently connected only in that part 29" is connected to terminal 16 instead of to terminal 12.

In the series-star connection of FIG. 7(a), terminals 11, 13 and 17 are similarly connected by lines 23, 24 and 25 to conductors 31, 32 and 33, for supply phases $L_1$, $L_2$ and $L_3$ respectively.

In the parallel-delta connection of FIG. 7(b), terminals 11, 12 and 13 are connected together and by line 23 to phase $L_1$ conductor 31. Terminals 15 and 18 are connected together and by line 24 to conductor phase $L_2$ 32 and terminals 14, 16 and 17 are connected together and by line 25 to phase $L_3$ conductor 33. The phase sequence is therefore A, B, C for either the series-star of the parallel-delta connection.

FIG. 8 shows a contactor system for providing the alternative phase-winding connections of FIG. 7(a) and FIG. 7(b). The contactor system comprises a double-pole contactor A1, A2, a double-pole contactor B1, B2 and a six-pole contactor C1 to C6. The terminals of contactors A and C numbered 11 to 18 are connected to the correspondingly numbered phase-winding terminals of FIGS. 7(a) and 7(b). Three terminals of contactors A and B provide the supply connections by lines 23, 24 and 25 to conductors 31, 32 and 33.

For the series-star connection of FIG. 7(a), contactors A and B are closed and contactor C is open. For the parallel-delta connection of FIG. 7(b), contactors A and C are closed and contactor B is open.

For many machines constructed according to the invention, it is possible to use alternative parallel-star and series-star or series-delta connections of the phase-windings. Such arrangements require six leads to be brought out from the phase-windings and a contactor system having eight contactors.

Such a switching arrangement is in general practicable for any of the following condition:

(i) The pole-number ratio does not exceed about 3.25:1;
(ii) Phase-winding coils are, in effect, removed from circuit by neutralization, for the lower pole-number;
(iii) The winding factor and the effective turns-number of phase-winding coils, for the lower pole-number, are reduced by short-chording;
(iv) A displaced modulating cycle, as is explained later herein, is used to reduce the winding factor and the effective turns-number for the lower pole-number;
(v) A transformer is used to apply different voltages to the phase-windings at the alternative speeds;
(vi) A lower flux is specifically required at the lower pole-number. This may arise because a lower torque is required at the higher speed, for example, for applications involving a slow forward work stroke and a fast light-load return stroke, or it may arise from the considerations discussed in the next paragraph.

In machines providing alternative pole-numbers in a large ratio to each other, the equal magnetic flux for both pole-numbers, which was the basis of the choice of phase-windings connections in Table II, corresponds to a much larger flux in the stator and rotor cores at the lower pole-number.

Often it may be that the size of the machine frame and rotor is dictated by the low-speed duty required. In such cases the frame size is more than ample for the high-speed duty requirement. It may then be preferred deliberately to reduce the flux density at the lower pole-number and thereby derive the advantage of series-star/parallel-star switching, which requires only six leads to be brought out from the phase-windings and six switching terminals instead of eight for the parallel-delta connection.

FIGS. 9(a) and 9(b) of the drawings show the alternative series-star and parallel-star connections of the phase-winding and FIG. 10 shows the corresponding contactor system.

In FIGS. 9(a) and 9(b), the first phase-winding A comprises winding parts 41 and 42 respectively connected between terminals 1, 2 and 3. The remaining two phase-windings referenced B and C, respectively, similarly comprise winding parts 41' and 42' respectively connected between terminals 3, 4 and 4, 5 and winding parts 41" and 42" respectively connected between terminals 5, 6 and 6, 7.

In the series-star connection of FIG. 9(a), terminals 1, 3 and 5 are respectively connected by leads 23, 24 and 25 to conductors 31, 32 and 33, for supply phases $L_1$, $L_2$ and $L_3$ respectively.

In the parallel-star connection of FIG. 9(b), terminals 1, 3 and 5 are connected together and terminals 2, 4 and 6 are respectively connected by leads 23, 24 and 25 to conductors 31, 32 and 33 of supply phases $L_1$, $L_2$ and $L_3$. The phase sequence is therefore A, B, C for each of the alternative connections.

FIG. 6 shows a contactor system for providing the alternative phase-winding connections of FIG. 9(a) and FIG. 9(b). The contactor system comprises a three-pole contactor A1 to A3 and a five-pole contactor B1 to B5. The terminals of contactor A are connected by lines 23, 24 and 25 to the three-phase supply on conductors 31, 32 and 33. Three terminals of contactor B are similarly connected. The remaining terminals of the two contactors, numbered 1 to 6 are connected to the correspondingly numbered terminals of the phase-windings as shown in FIGS. 9(a) and 9(b).

For the series-star connection of FIG. 9(a), contactor A is closed and contactor B is open. For the parallel-star connection of FIG. 9(b), contactor B is closed and contactor A is open.

In machines constructed according to the invention, phase-winding coils cannot be eliminated in the modulated condition by series-parallel switching using branched phase-winding circuits. Such an arrangement would permit of coil elimination in the series connection, whereas the modulated condition may correspond to a parallel connection. To eliminate coils with parallel-connected phase-windings, the coils to be eliminated are wound in two halves, which are connected in the same sense in series connection and in opposing senses in the parallel connection. The divided coils are then always connected in circuit and produce a normal magnetic effect in series connection, but no magnetic effect in parallel connection.

Preferred modulation to lower pole-number

In operation at the unmodulated pole-number, a machine according to this invention appears electrically just as a conventional single-speed machine wound for that pole number, in that the unmodulated pole-number is the same as the number of coil-groups. By pole-amplitude modulation, the alternative pole-number may be made either higher or lower than the unmodulated pole-number. However, in machines according to the present invention, it is preferred for the modulated pole-number to be lower than the unmodulated pole-number.

Sinusoidal pole-amplitude distribution

It is further preferred for the coil distribution per phase to be sinusoidal. This may be arranged to provide a sinusoidal modulating wave, instead of the square modulating wave shown for example in FIG. 7(a), or to provide a sinusoidal M.M.F. distribution for either the unmodulated pole-number or the modulated pole-number. It is preferred so to arrange the distribution of the coil-groups as originally wound on the machine that a sinusoidal distribution is provided, at the lower, modulated pole-number.

A truly sinusoidal distribution would be theoretically ideal but cannot be realised practically. The term "sinusoidal" as used herein denotes a waveform of generally sinusoidal shape, such as is provided in the example of FIGS. 3(a), 3(b) and FIG. 4 and such as is provided in the examples described herein with reference to the further FIGS. 11(a), 11(b) and FIGS. 12(a), 12(b) of the drawings.

FIGS. 11(a) and 11(b) show the 8:2 pole machine described with reference to FIGS. 3(a), 3(b) and FIG. 4, in which the unmodulated 8-pole phase windings are wound on a 36-slot frame with a coil-pitch of 15 slots. The coil groups of phase-winding A are denoted by the references A1 to A8.

FIG. 11(b) shows the interconnections of the coil-groups of phase-winding A. The coil-groups are series connected in the order shown between terminals 54, 55 and 55, 56. The other two phase-windings are similarly arranged.

For 8-pole operation, the coil-groups are series energised between terminals 54 and 56. For 2-pole operation, terminals 54 and 56 are joined and the windings energised between terminals 54, 56 and 55.

As an alternative to the sinusoidal arrangement shown in FIGS. 11(a) and 11(b), it is satisfactory to use a co-sinusoidal coil grouping 2–1–1–2—2–1–1–2. This arrangement corresponds to a displacement of the modulating wave by two coil-groups. The coil-pitch is 15 slots in both cases.

The unmodulated 8-pole waveform is the same in both cases. The modulated 2-pole waveform is different in the two cases, but the 5th and 7th harmonics of the 2-pole waveform are eliminated by the coil-pitch of 15-slots.

The reason for wishing sometimes to use this arrangement is that the fundamental winding factor is substantially reduced by this re-grouping. Thus, the simplest form of connection, series-star/parallel-star for 8-poles and 2-poles respectively, may be used, whilst still obtaining full flux-density at the higher speed. Where the rating at the higher speed is not heavy, this arrangement is useful.

This coil-group arrangement is, in effect, another way of obtaining a lower value of winding factor, intermediate between those values which arise from using one of the coil-pitches which are acceptable for both pole-numbers. For example, for 8:2 poles, the coil-pitch must be approximately equal to three coil-pitches or to one coil-pitch, with respect to 8 poles. These give chording factors of: sin 67.5° (0.924) and sin 22.5° (0.383), respectively, with respect to 2-poles. The effective additional chording factor, relative to sinusoidal distribution, which is introduced by re-grouping in the form 2–1–1–2—2–1–1–2, is 0.69.

Referring again to Table I, some of the pole-number combinations tabulated under 6-cycle, 12-cycle and 18-cycle modulation waves are multiple repetitions of lower pole-number combinations and are combinations for which series-parallel switching of the phase-windings may be employed to provide the alternative speeds. Machines using an even number of modulating cycles giving pole-number combinations which are not multiple repetitions of lower pole-number combinations, cannot use a simple form of series-parallel switching for the lower pole-number. This fact would necessitate a considerable increase in the number of leads brought out from the phase-windings for switching but for the use of the modification described below. As shown in Table II, only two such cases are thought to have great practical importance, namely the pole-number combinations 10:2 poles and 14:2 poles, using a 6-cycle modulating wave.

Machines using an even number of modulating cycles may require some coils to have a slightly different number of turns from the rest. This is a small but not a serious complication. Consider one half of a phase-winding where the unmodulated number of pole-pairs is odd. Suppose that alternate coil-groups in this half-winding are connected in alternate current paths. There will then be one more coil-group in one path than in the other path. It follows, by simple symmetry, that the total M.M.F.'s in the two paths, in relation to a 2-pole flux wave, are co-phasal. The two M.M.F.'s may or may not be equal, though they will certainly be of the same order of magnitude. They can be made exactly equal either by suitable coil-grouping or by adjustment of the numbers of turns in certain coils. The same argument applies to each half-winding. The method of connection will be made clearer by considering one case as an example, which will be described with reference to FIG. 12(a) and FIG. 12(b) of the drawings.

FIG. 12(a) shows the clock diagrams of a 10:2-pole winding, using six-cycle modulation, having the phase-windings wound in a 72-slot frame with a coil-pitch of 22 slots. In the figure, the dash-lines A, B and C indicate the phase axes of symmetry. The circle D represents the periphery of the phase-windings and the envelope E represents the 6-cycle modulating waves. Successive positive and negative modulating half cycles are denoted by the transitions from inside to outside the circle D. The numbers outside the circle D and envelope E indicate the number of coils per group. In FIG. 12(a) the coil-groups of phase-winding A are denoted by the references A1 to A10. The coil-groups for the other two phase-windings, not referenced in the figure, correspond to those of phase-winding A, considered from the corresponding phase axis of symmetry marked.

FIG. 12(b) shows the interconnections of the coil-groups of phase-winding A. The coil-groups are series connected in the order shown between terminals 51, 52 and 52, 53. The arrangement of the other two phase-windings is identical.

As shown in FIG. 12(a), the preferred coil-grouping per phase is 1–3–4–3–1—1–3–4–3–1, as shown by the figures around the perimeter. This is approximately sinusoidal with respect to 2-poles. The three dash-lines A, B and C in FIG. 12(a), the axes of symmetry for the three phase-windings, divide each phase-winding into two halves, and intersect the winding midway between the smallest coil-groups. The modulating cycle is normally applied to the winding symmetrically, in the manner shown, so that the axes of symmetry intersect the mid-points or modulating cycles.

Considering phase-winding A, it is clear that the six coil-groups 1–4–1—1–4–1 for the two half-windings can be connected in series, and the four coils-groups 3–3—3–3 for the two other half-windings can similarly be connected in series. It can be shown that these two coil-groups combinations when connected in parallel have virtually the same E.M.F. in each path. They are accordingly connected in parallel, and in the sense required by the modulating cycle, for the lower pole-number, and in series for the higher pole-number. That is in FIG. 12(b), terminals 51 and 53 are joined for the parallel connection.

The other two phase-windings have corresponding connections, bearing in mind that the origins of the phases are displaced by $$\left(\frac{2\pi}{3}\right)$$

and the phase interconnections are as shown in FIG. 12(a).

If the very slight lack of balance between the two parallel paths is not acceptable, an appropriate change can be made in the number of turns per coil of some of the coils.

In the design of machines of some pole-number combinations according to the invention, sinusoidal distribution may conveniently include phantom coil-groups of zero turns-number. This has a practical advantage in that it may permit a considerable reduction in the minimum number of slots which are needed to accommodate a multi-pole speed-changing winding. Application of the sinusoidal distribution procedure illustrated in the foregoing examples will actually require, in certain windings, that certain coil-groups shall have zero turns.

For example, a winding for 10:2 poles in 42 slots, groups 0–2–3–2–0—0–2–3–2–0, is actually superior in performance to a 10:2 pole winding in 72 slots, grouped 1–3–4–3–1—1–3–4–3–1. It would be possible to use the grouping 0–4–6–4–0—0–4–6–4–0 in 84 slots, which simply doubles the 42-slot arrangement.

A further example is a winding for 14:2 poles, grouped 0–1–3–4–3–1–0—0–1–3–4–3–1–0, in 72 slots. This is preferable to the alternative of 1–2–4–5–4–2–1—1–2–4–5–4–2–1 in 114 slots. In general, the possibilities which arise from using phantom coil-groups for large-ratio pole-amplitude modulation are considerable.

In all cases of the pole-combinations given in Table I, the original number of poles is not a multiple of three. Since the number of modulating cycles is always a multiple of three, the resultant number of poles cannot be a multiple of three. Neither of the pole numbers in any of the combinations in Table I can therefore be a multiple of three. This is, in fact, the condition for exact symmetry between phases.

There is, however, complete freedom to repeat three (or six or more) times any pole-combination in Table I. Therefore, for example, the combination 8:2 poles provides 24:6 poles. The combination 10:4 poles similarly provides 30:12 poles. In practice, therefore, there is complete freedom to choose the smaller pole-number (2, 4, 6, 8, 10, 12 etc.); and for each smaller pole-number there is a wide variety of possible larger pole-numbers.

Not every pole-combination is as available. For example, 6:36 poles for 1000:167 r.p.m. on 50 cycles/second is not possible. On the other hand, in most practical cases one of the nearest available alternatives, 6:30 poles for 1000:200 r.p.m., or 6:42 poles for 1000:143 r.p.m. would be likely to be acceptable.

What we claim is:

1. A rotary electric machine having a three-phase winding comprising consecutive coils forming coil-groups of consecutive phases each coil-group comprising one or more coils, said three-phase winding having first current-supply connections providing a first number of poles defined by the number of said coil-groups in each phase, said three-phase winding having second current-supply connections alternative to said first connections defining a pole-amplitude modulation wave applied to the three-phase winding, said pole-amplitude modulation wave having an even multiple of three consecutive positive and negative wave half-cycles, each half-cycle including a number of consecutive coils, the negative half-cycles being characterized by reversal of sense of current flow in the coils of said negative half-cycles relative to the sense of current flow therein with said first current-supply connections, said pole-amplitude modulation wave providing a second number of poles alternative to said first pole-number, said second pole-number being defined as the numerical difference between the first pole-number and the number of said half-cycles of said pole-amplitude modulation wave and the ratio of said first and second pole-numbers being other than 2:1, said coils of said three-phase winding being chorded to an even number of pole-pitches corresponding to a third pole-number, said third pole-number being defined as the numerical sum of said first pole-number and the number of half-cycles of said pole-amplitude modulation wave.

2. A rotary electric machine as claimed in claim 1 in which, in at least alternate half-cycles of said pole-amplitude modulation wave, the coils included therein are unequally divided in number between the three phases.

3. A rotary electric machine as claimed in claim 1, in which, in at least alternate half-cycles of said pole-amplitude modulation wave, the coils included therein are unequally grouped in number in the successive coil-groups.

4. A rotary electric machine as claimed in claim 3, in which a coil group comprising a smaller number of coils is located at one end at least of the consecutive coils included in said half-cycles of said pole-amplitude modulation wave.

5. A rotary electric machine as claimed in claim 1, in which said alternative first and second current-supply connections are provided by alternative series-star and parallel-star connections of the three-phase winding.

6. A rotary electric machine as claimed in claim 1, in which the number of half-cycles of said pole-amplitude modulation wave is greater than said first number of poles, said second pole-number being defined as said number of half-cycles less said first pole-number and said second pole-number is less than said first pole-number.

References Cited by the Examiner

UNITED STATES PATENTS

| 2,715,204 | 8/55 | Siskind | 318—224 |
|---|---|---|---|
| 2,820,938 | 1/58 | Davies | 318—224 |
| 2,850,690 | 9/58 | Rawcliffe | 318—224 |
| 2,898,534 | 8/59 | Rawcliffe | 318—224 |
| 2,900,587 | 8/59 | Piguet | 318—224 |

JOHN F. COUCH, *Primary Examiner.*